United States Patent [19]

DuMont

[11] Patent Number: 5,331,760
[45] Date of Patent: Jul. 26, 1994

[54] FISH-ATTRACTING FLOAT

[76] Inventor: Jon A. DuMont, 9573 Woodstate Dr., Cincinnati, Ohio 45251

[21] Appl. No.: 116,848
[22] Filed: Sep. 7, 1993
[51] Int. Cl.5 ............................................. A01K 93/00
[52] U.S. Cl. .................................... 43/17.1; 43/44.91
[58] Field of Search .................. 43/17.1, 43.1, 42.31, 43/44.91

[56] References Cited

U.S. PATENT DOCUMENTS

| | | | |
|---|---|---|---|
| 3,213,562 | 10/1965 | Salvin et al. | 43/17.5 |
| 3,310,902 | 3/1967 | Godby | 43/17.1 |
| 3,416,254 | 12/1968 | Bornzin | 43/17.1 |
| 4,805,339 | 2/1989 | Fuentes et al. | 43/17.1 |
| 4,951,410 | 8/1990 | Ly | 43/17.1 |
| 5,046,278 | 9/1991 | Szilagyi et al. | 43/17.1 |
| 5,177,891 | 1/1993 | Holt | 43/17.1 |

Primary Examiner—P. Austin Bradley
Assistant Examiner—Jeanne M. Elpel
Attorney, Agent, or Firm—Charles R. Wilson

[57] ABSTRACT

A fishing float comprises a buoyant body having a water-tight chamber and an electronic means therewithin to attract fish. A integrated circuit device with at least one fish attracting sound recorded on it is housed within the water-tight chamber and is operably connected to a speaker and an electrical power source. Upon activation, the fishing float emits the fish attracting sounds such as natural insect sounds within its general vicinity to attract fish.

19 Claims, 3 Drawing Sheets

FISH-ATTRACTING FLOAT

This invention relates to floats for use in float fishing. More particularly, the invention relates to floats capable of attracting fish.

Float fishing is a very popular form of fishing. It is enjoyed by young and old, including the novice and the veteran fisherman. In this form of fishing, a buoyant float is attached to a fishing line above a sinker weight and a hook. It is attached on the line anywhere from a few inches from the hook at the end of the line to several feet from the hook, depending on the water depth and fish species desired.

There have been developed several fishing float designs over the years. Some have been designed more for aesthetics than anything else. Others have been designed for the purpose of enhancing the fisherman's ability to catch fish. For example, being able to see the float can be a problem if the hook and associated gear is cast several feet from the shoreline or from the boat. A brightly colored float or a long float which extends several inches above the water surface are both more visible and have been designed for this purpose. Turbulent water conditions due to wind also can be a problem. The fisherman who encounters this situation needs a float which has a relatively heavy weight bottom to force the float to sit more upright in the water. Floats are even designed based on the size of the fish likely to be caught. A smaller or weaker fish will only slightly move a float when it strikes, thus the need for a more sensitive float designed to detect such fish strikes and cause a noticeable float movement. A larger or stronger fish will more noticeably move the float when it strikes. A heavier float is more ideal for use in fishing for this type of fish.

Fishing floats have also been designed where a secondary feature has been to attract fish. For example, U.S. Pat. No. 4,291,484 describes an illuminated float. The primary function of the illumination is to indicate the position of the float. Apparently, when the fish strikes and pulls the float downwardly into the water, the fisherman will be alerted by the disappearance of the illumination. The secondary feature is that fish are said to be attracted to the float by the illumination.

It is apparent much activity in the fishing float industry has occurred over the years. Other aspects of the industry have also been active in producing new and improved fishing lures, sinker weights, rods, reels and other fishing paraphernalia. All for the purpose of making the sport of fishing more enjoyable.

There has now been developed a float primarily designed to attract fish to the vicinity of the float. The float serves the dual functions of initially drawing fish to near the float and associated hook and then indicating when a fish has struck. The float is economical to produce and effective for its purpose. It has the capability of further enhancing the sport of fishing and making the fisherman's outing even more enjoyable.

SUMMARY OF THE INVENTION

A fishing float comprises a buoyant body adapted for partial submersion in water and having electronic means to emit a fish attracting sound. The body of the float has a hollow interior which houses an integrated circuit device with a recording of fish attracting sounds, a speaker for the sounds and a battery operably associated with the integrated circuit device and speaker. Activation of the electronic means by the fisherman causes fish attracting sounds to emanate from the float into the water in the float's general vicinity.

DETAILED DESCRIPTION OF THE INVENTION

The fishing float of the invention is described in detail in the following paragraphs and with particular reference to the drawings. The float is useful for the fisherman who views fishing as a sport and by the commercial fisherman. However, its use by the fishing sportsman is particularly preferred and is described in detail.

Figure 1:
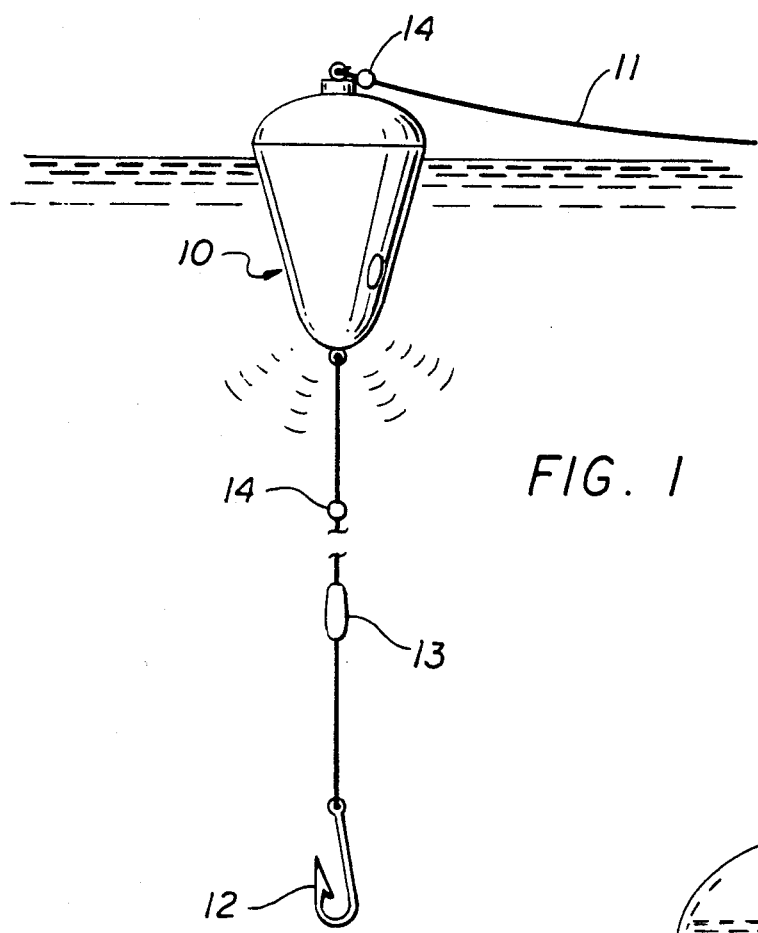
FIG. 1 is an environmental view of the fishing float of the invention showing its mode of use.

With reference to FIG. 1, there is shown the fishing float 10 of the invention in use. The float is slidably attached to a fishing line 11. A hook 12 is attached to the line's end and a sinker weight 13 is positioned between the float 10 and hook 12. Beads 14 fixedly attached to the line above and below the float ensure the float remains within that part of the line and in effect determines the depth of fishing.

Figure 2:
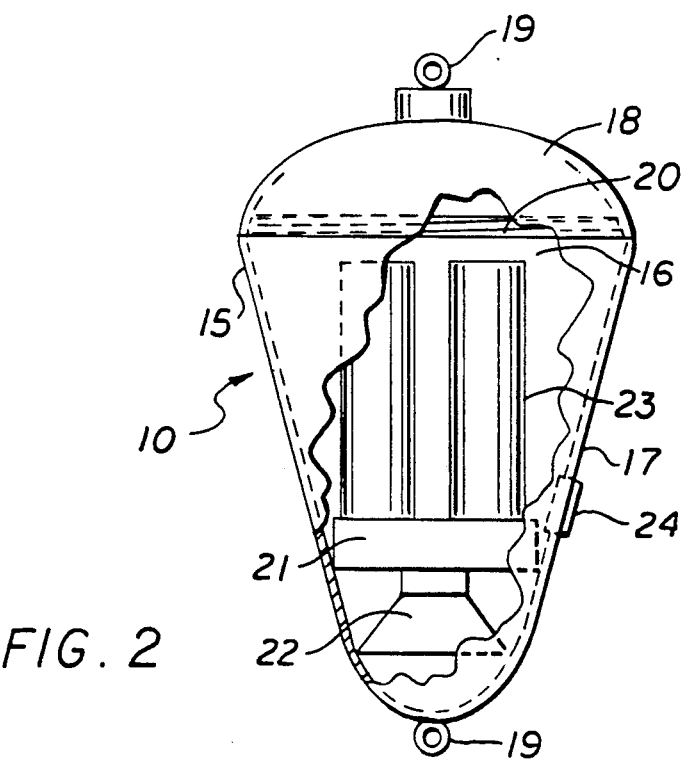
FIG. 2 is side view partially in section of the fishing float of FIG. 1.

The fishing float 10 as most evident in FIG. 2 is an elongated buoyant body 15 with a water-tight chamber 16 formed within it. The buoyant body as shown is comprised of a lower housing 17 and an upper housing 18 which are threadably engaged together. Line attaching loops 19 are provided on the float where needed. A gasket 20 is used between the housings to ensure the water-tight connection. The walls of the lower and upper housings are thin to form the water-tight chamber 16.

The buoyant body of the float can be any shape, it only being necessary that a significant portion of it extends above the water line to be visible to the fisherman. The buoyant body 15 of the fishing float 10 is elliptical-shaped. Other shapes include spherical-shaped, cylindrical-shaped and frustoconical-shaped. While shown as a two piece structure whereby access is gained by separating the upper housing from the lower housing, a one piece structure buoyant body which has had the electronic means discussed below permanently sealed within it is also feasible. The body is preferably made of plastic because of the plastic's ability to be mass molded at a low cost. However, it can also be formed from wood or any other material which forms a buoyant float.

In accord with the invention, electronic means of the float 10 are housed in the water-tight chamber 16 of the fishing float. The electronic means include an integrated circuit device 21, speaker 22 and batteries 23 which are operably connected. The integrated circuit device 21 is capable of having a predetermined sound recorded/stored in it and capable of transmitting that sound to the speaker. An electronically erasable programmable read-only memory (EEPROM) device is an example of a suitable integrated circuit device which is commercially available.

A recording of at least one fish attracting sound, preferably a natural insect sound which is a known source of food for fish is stored in the integrated circuit device. Flies, beetles, and crickets are examples of insects whose sound is recorded and stored on the integrated circuit device. Other examples of sounds which are considered to attract fish include those sounds produced by frogs, feeding fish, injured fish and fish feeding frenzies. At least one sound is recorded and stored, though preferably a number of different sounds are recorded and stored to enhance the chances that a fish will be attracted to the vicinity of the fishing float. The sound can be continuous or intermittent. That is, the sound can be recorded such that when broadcast into the water a long continuous sound is repeatedly emitted or short sound segments are intermittently and randomly emitted. Integrated circuit devices are commercially available which are programmable for use in this invention.

The speaker 22 is operably associated with the integrated circuit device 21 to transmit signals received from the device through the wall of the buoyant body and into the water within the general vicinity of the float. It can be a piezo speaker, transducer speaker or any other speaker used for transmitting recorded sounds. The batteries 23 are conventional dry cell batteries and provide the needed source of electrical energy for the integrated circuit device and speaker. They are mounted in a fashion to facilitate ready removal and replacement when needed. While not shown, conventional mounting means such as spring clips, clamping clips, screws and adhesives are attached to the inside walls of the lower housing 17 to receive and hold in a secure fashion the batteries as well as the integrated circuit device and the speaker. An electrical switch 24 is positioned in lead wires or electronic circuitry connecting the integrated circuit device, speaker and batteries. Any conventional switch mechanism which serves to make a connection to complete the circuit is used.

A ballast, if needed, can be placed in a lowermost part of the float to force it to sit in an upright position in the water. A heavy metal weight, sand or other granular material with a density greater than water is suitably confined in the lowermost part. The float 10 is constructed such that the electronic means used to produce the fish attracting sound are positioned in the lower housing 17 and effectively acts as ballast. Other float designs of the invention may have the electronic means positioned more near the top of the float in which case added ballast must be provided.

Figure 3:
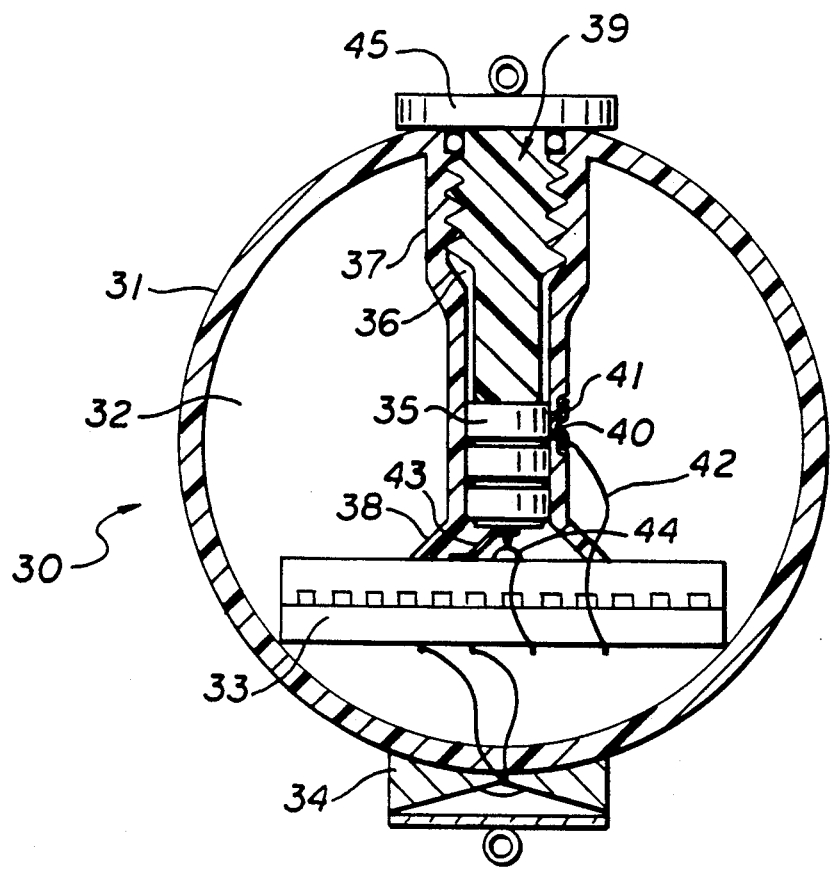
FIG. 3 is a side view partially in section of another fishing float of the invention wherein the speaker is mounted on the outside wall of the float.

FIG. 3 shows another embodiment of the fishing float 30 of this invention. A buoyant body 31 in the shape of a sphere has a water-tight chamber 32 within it. As shown, the buoyant body is one piece. It had been a two piece sphere prior to assembly of its component parts. After full assembly, the two pieces are readily and permanently joined by fusion or an adhesive to give the one piece spherical-shape buoyant body 31. An integrated circuit device 33 is mounted within the chamber 32 and electrically connected to an underwater speaker 34 mounted on the outside of the buoyant body at its bottom and electrically connected to a set of three button batteries 35.

The fishing float 30 is designed with a switch mechanism which is exposed to minimal water contact and is particularly suited for use in the invention. The buoyant body 31 further has an internal compartment 36 defined by an open-top generally cylindrical wall 37 which extends from the top of the spherical-shaped body inwardly to preferably below the mid-point of the body. It has a flared wall 38 at the bottom which is secured to the integrated circuit device 33 for stability purposes. The compartment 36 is internally threaded. It holds the three button batteries 35 and receives a threaded plug 39. Preferably, the batteries rest in the compartment 36 below the mid-point of the buoyant body for balance and proper water surface orientation. The switch mechanism operates by twisting the plug 39 to close or open the electronic circuit. For this purpose, the cylindrical wall 37 has an opening 40 in alignment with an uppermost battery contained within the compartment 36. The opening 40 has a conductive spring clip contactor 41 permanently positioned in the opening and a wire 42 leading from it to the integrated circuit device 33. A spring restrainer 43 is positioned on a top surface of the integrated circuit device 33 and directly below the batteries 35. The spring restrainer has one end mounted on the integrated circuit device 33. A free end is in contact with the lowermost of the button batteries and, when in a rest position, holds them out of contact with a dot contactor 44 mounted on the integrated circuit device 33 and electrically connected thereto. The spring restrainer 43 has a forked tip or has an opening (not shown) in its tip through which the contactor is able to protrude and make contact with the lowermost battery for the purpose of completing the circuit.

The threaded plug 39 of the fishing float 30 is twisted downwardly to contact the batteries 35 and in turn force them downwardly until electrical contact is made with the contactor 44. The plug 39 has a threaded body which is dimensioned to fit into the internal compartment 36. A cap 45 at the top end of the threaded plug 39 is used as a means by which the user can manipulate the plug to activate or deactivate the electrical power used by the integrated circuit device 33 and speaker 34. An 0-ring is positioned around the plug near the cap to seat in a groove molded into the internal compartment 36 near its opening to ensure water does not enter. The fishing float 30 is particularly preferred because of its ease of assembly and reliable performance.

Figure 4:
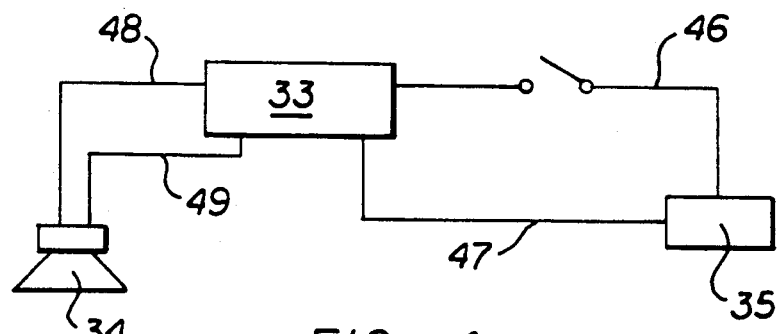
FIG. 4 is a schematic of the electronic circuit used in the fishing float of FIG. 3.

FIG. 4 shows in schematic form the electronic circuit of the components used in the fishing float 30 of FIG. 3. Thus, leads 46 and 47 extend from the batteries 35 to the integrated circuit device 33. The switch mechanism is interposed in the lead 46 to activate the components. Leads 48 and 49 operably connect the integrated circuit device 33 to the speaker 34. Closing of the switch mechanism causes the sounds which are recorded and stored on the circuit device 33 to be transmitted to the speaker 34 and into the water. It continues to transmit until deactivated by the fisherman.

Figure 5:
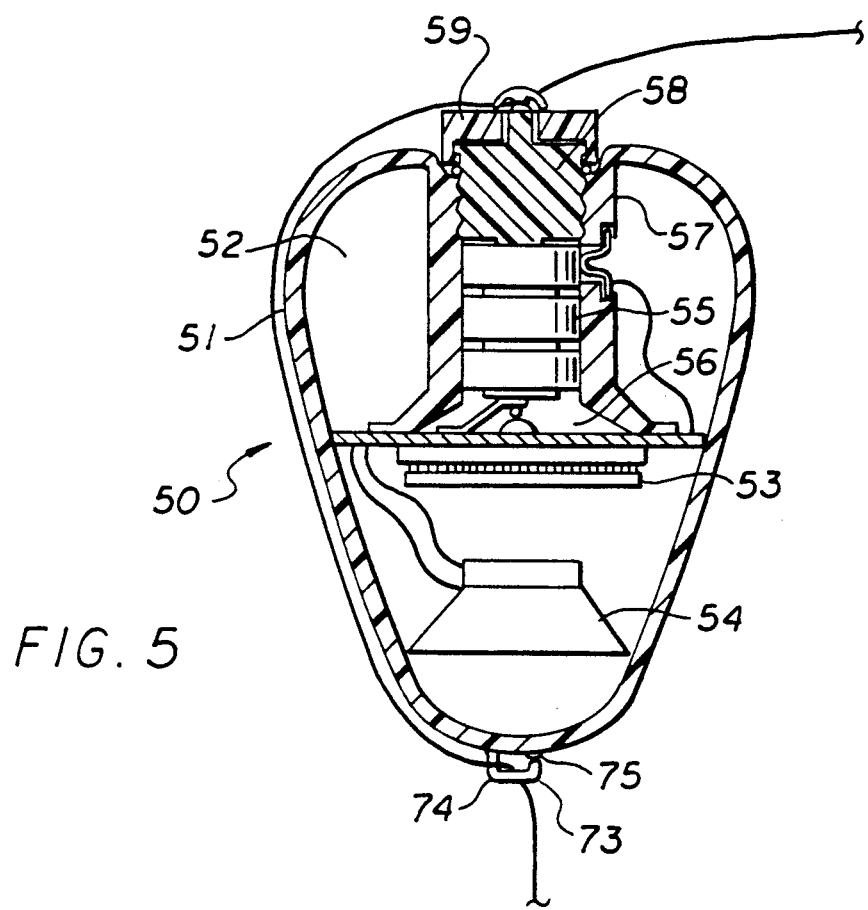
FIG. 5 is a side view in section of a fishing float of the invention having a line lock mechanism.
Figure 6:
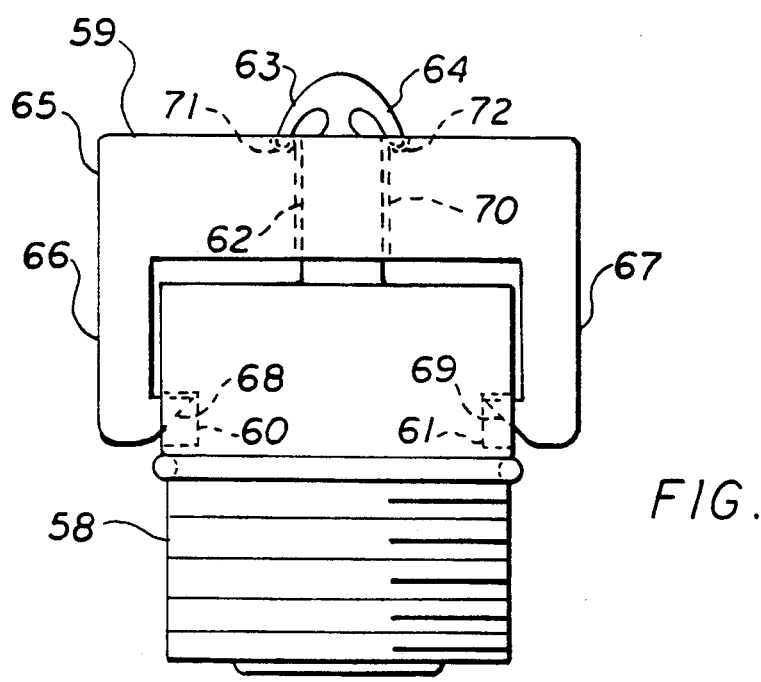
FIG. 6 is a top view of a threaded plug and a line lock member used in the fishing float of FIG. 5.

FIGS. 5 and 6 illustrate another fishing float of the invention which has a line lock mechanism. With reference to FIG. 5, the fishing float 50 has a buoyant body 51 having an elliptical shape with a tapered bottom and rounded top. A water-tight chamber 52 within it houses an integrated circuit device 53, speaker 54 and batteries 55. The integrated circuit device 53 is positioned on a circuit board extending across the inside walls of the chamber 52 in a mid-section thereof. The speaker 54 is mounted on the wall near a bottom of the chamber 52 and the batteries 55 are mounted in an internal compartment 56 defined by a cylindrical wall 57 which extends from the top center of the buoyant body down into its chamber. A channel extends around the top of the cylindrical wall to receive the line lock mechanism as further discussed below. The integrated circuit device 53, speaker 54 and batteries 55 are electrically connected and operated by a switch mechanism having the same spring clip contactor, dot contactor and spring restrainer components described above with reference to FIG. 3.

With particular reference to FIG. 6, a threaded plug 58 and line lock member 59 are used with the fishing float 50. The threaded plug 58 has external threads to engage the internal threads on the cylindrical wall 57 and an 0-ring groove at the top thereof which together with the 0-ring keeps water from entering the chamber 52. It should be understood though, other structural configurations and seals are possible to ensure a water-tight chamber 52. The plug 58 also has two opposed recesses 60 and 61 in a side wall above the thread line. The recesses are to receive snap-in tabs of the line lock member 59 further described below. A vertically extending shaft 62 on the top of the threaded plug has line engaging hook-like members 63 and 64, also further discussed below.

The line lock member 59 is configured to snap onto the threaded plug and permanently remain there. It operates in conjunction with the threaded plug and the buoyant body 51 of the float to hold the fishing line. The line lock member has a main body 65 with two downwardly extending ears 66 and 67 having snap-in tabs 68 and 69 at terminuses thereof. The ears and the tabs are dimensioned to be received in the recesses 60 and 61 of the threaded plug and to ride up or down in the respective recesses in response to threading of the buoyant body and threaded plug together. The line lock member 59 also has a central bore 70 to receive the vertically extending shaft 62 of the threaded plug 58. Further, a top surface of the body 65 of the line lock member 59 has two channels 71 and 72 positioned around the central bore opening to receive tips of the hook-like members 63 and 64 on the vertically extending shaft 62. As best seen in FIG. 6, the two hook-like members 63 and 64 are downwardly protruding arm members with tips at their ends which engage the channels 71 and 72, respectively, of the line lock member.

The buoyant body of the fishing float 50 works in conjunction with the threaded plug 58 and line lock member 59 to form an electrical connection and hold the fishing line. Thus, when assembled as above described, the user positions the fishing line under and/or around the hook-like members depending on whether slip- or fixed-line fishing is to be enjoyed. The user next grasps the threaded plug and/or line lock member and twists the buoyant body until it is fully threaded onto the threaded plug. This forces the batteries to make electrical contact with the dot contactor. It also forces the line lock member to ride up relative to the threaded plug so as to cause the tips of the hook-like members 63 and 64 into contact with the channels 71 and 72 in the top surface of the line lock member. This locks the fishing line in place.

The advantage of the fishing float 50 of FIGS. 5 and 6 is the provision of a means to connect-disconnect the fishing line to the float without having to completely unscrew the threaded plug. This ensures that the batteries are not lost.

As an optional feature and still with reference to FIG. 5, the fishing line used with fishing float 50 can be attached to a quick attach line member 73. It comprises a flexible L-shaped member 74 and a shim member 75 both positioned on the bottom of the buoyant body 51. The L-shaped member has one leg extending from the buoyant body and a free leg extending back towards the buoyant body. The shim member 74 is a rounded protrusion which extends from the buoyant body. The free leg of the L-shaped body and the shim member are positioned such that they touch. The free leg is sufficiently flexible that a fishing line can be slipped between it and the shim member and trapped therein. The fishing line can be free as shown or looped to fix the float in one line position as desired. The quick attach line member 73 provides a means whereby the fishing float 50 will remain upright in the water during use.

Optionally, an illumination means such as a lamp or LED is mounted within the water-tight chamber of the fishing floats of the invention and connected into its circuitry. The illumination means is of benefit particularly at night to indicate when a fish has struck. It can light continuously or blink. Preferably, the upper and lower housings are transparent or at least translucent to better transmit the light.

In operation, the fisherman positions the fishing float of the invention on the fishing line in a conventional fashion. The switch mechanism is manipulated to activate the system. The fisherman casts the float and associated fish gear into the water. The hook and sinker weight settle to a pre-determined depth, while the float rights itself in the water. The float emits a fish attracting sound in a continuous or in an intermittent manner depending on how the sounds are programmed into the integrated circuit device. The water transmits acoustic signals efficiently so as to attract fish several feet away. Fish are attracted into the general vicinity of the float and then are attracted by bait on the fishing hook.

While the invention has been described in detail, it should be understood various modifications can be made to the fishing float. All changes of an obvious nature to the float are considered within the scope of the appended claims.

I claim:

1. A fishing float for attachment to a fishing line with a hook at said fishing line's end, said float capable of floating on water and noticeably moving in response to a fish strike on the hook and further being capable of attracting fish, said fishing float comprising:
   (a) a buoyant body with a water-tight chamber therewithin;
   (b) an integrated circuit device mounted within the water-tight chamber of the buoyant doby, said integrated circuit device having recorded on it at least one fish attracting sound;
   (c) a speaker operably associated with the integrated circuit device to broadcast the at least one fish attracting sound into the general vicinity of the fishing float; and
   (d) a source of electrical power with means to activate the integrated circuit device and speaker.

2. The fishing float of claim 1 wherein the buoyant body is a two piece structure having a lower housing and an upper housing, said housing having means to connect together in a manner to provide the water-tight chamber.

3. The fishing float of claim 1 wherein the buoyant body is one piece with the integrated circuit device permanently mounted in its water-tight chamber.

4. The fishing float of claim 1 wherein the source of electric power is a battery.

5. The fishing float of claim 4 wherein the integrated circuit device is an electrically erasable programmable read-only memory device.

6. The fishing float of claim 4 wherein the means to activate the integrated circuit device and speaker is a switch mechanism.

7. The fishing float of claim 6 wherein the integrated circuit device has stored at least one natural insect sound.

8. The fishing float of claim 1 wherein the buoyant body further has an internal compartment extending from a top surface downwardly into its water-tight chamber, a set of batteries positioned therein, and a threaded plug dimensioned to fit within the compartment and capable of engaging the batteries to cause an electrical connection.

9. The fishing float of claim 8 wherein the speaker is an underwater speaker and is mounted on the outside of the buoyant body below the float's water line when in use.

10. The fishing float of claim 8 further wherein the threaded plug has a line lock member operably associated therewith to hold a fishing line in response to threading of the threaded plug into the internal compartment.

11. The fishing float of claim 10 wherein the threaded plug has a set of opposed recesses in a side wall and a vertically extending shaft from a top surface with downwardly protruding arm members at an end of the shaft and wherein the line lock member comprises a main body with two ears extending vertically downwardly therefrom with each said ear having a snap-in tab to engage one of the recesses in the threaded plug and further having a central bore to receive the vertically extending shaft from the threaded plug and channels in a top surface to receive tips of the arm members on the vertically extending shaft, wherein threading of the threaded plug into the internal compartment of the buoyant body activates the integrated circuit device and speaker as well as forces the line lock member to move upwardly relative to the threaded plug and cause the tips of the arm members on the vertically extending shaft to engage the channels in the top surface of the line lock member to trap the fishing line therein.

12. A fishing float for attachment to a fishing line and which is capable of attracting fish and signaling when a fish has struck, said fishing float comprising:
(a) a buoyant body with a water-tight chamber therewithin and having an internal compartment extending from a top surface downwardly into the water-tight chamber, a threaded plug dimensioned to fit within the internal compartment, and a line lock member operably associated with the threaded plug to hold a fishing line in response to threading of the threaded plug into the internal compartment;
(b) an integrated circuit device mounted within the water-tight chamber of the buoyant body, said integrated circuit device having recorded on it at least one fish attracting sound;
(c) a speaker operably associated with the integrated circuit device to broadcast the at lest one fish attracting sound into the general vicinity of the fishing float; and
(d) a set of batteries positioned in the internal compartment of the buoyant body such that they are capable of being engaged by the threaded plug to cause an electrical connection so as to activate the integrated circuit device and speaker.

13. The fishing float of claim 12 wherein the buoyant body is a two piece structure having a lower housing and an upper housing, said housing having means to connect together in a manner to provide the water-tight chamber.

14. The fishing float of claim 12 wherein the buoyant body is one piece with the integrated circuit device permanently mounted in its water-tight chamber.

15. The fishing float of claim 12 wherein the integrated circuit device is an electrically erasable programmable read-only memory device.

16. The fishing float of claim 12 wherein the means to activate the integrated circuit device and speaker is a switch mechanism.

17. The fishing float of claim 16 wherein the integrated circuit device has stored at least one natural insect sound.

18. The fishing float of claim 12 wherein the speaker is an underwater speaker and is mounted on the outside of the buoyant body below the float's water line when in use.

19. The fishing float of claim 12 wherein the threaded plug has a set of opposed recesses in a side wall and a vertically extending shaft from a top surface with downwardly extending arms from an end of the shaft and the line lock member comprises a main body with two ears extending vertically downwardly therefrom wherein each said ear has a snap-in tab to engage one of the recesses in the threaded plug and further with a central bore to receive the vertically extending shaft from the threaded plug and channels in a top surface to receive tips of the downwardly extending arms on the vertically extending shaft, such that threading of the threaded plug into the internal compartment of the buoyant body activates the integrated circuit device and speaker as well as forces the line lock member to move upwardly relative to the threaded plug and cause the tips of the downwardly extending arms to engage the channels in the top surface of the line lock member to trap the fishing line therein.

* * * * *